April 27, 1954   M. J. THOMAS ET AL   2,676,890
PACKAGE OF SHORTENING MATERIAL
Filed Jan. 27, 1951   2 Sheets-Sheet 1

INVENTORS
MARION J. THOMAS
JAMES J. PROHASKA
BY
R. G. Story
ATTORNEY

April 27, 1954     M. J. THOMAS ET AL     2,676,890
PACKAGE OF SHORTENING MATERIAL Filed Jan. 27, 1951     2 Sheets-Sheet 2

MARION J. THOMAS
JAMES J. PROHASKA
*INVENTORS*

BY *R. L. Story*

ATTORNEY

Patented Apr. 27, 1954

2,676,890

UNITED STATES PATENT OFFICE 2,676,890

PACKAGE OF SHORTENING MATERIAL

Marion J. Thomas, Chicago, and James J. Prohaska, La Grange, Ill., assignors to Swift & Company, Chicago, Ill., a corporation of Illinois Application January 27, 1951, Serial No. 208,186

4 Claims. (Cl. 99—171)

This invention relates generally to an improvement in making roll-in pastry dough products and more particularly to an improvement in the production and packaging of fatty material used in making roll-in pastry dough products, such as puff pastry and Danish pastry.

Heretofore it has been the commercial practice in making roll-in pastry dough products, such as puff pastry and Danish pastry, to roll out about 10-12 pounds of pastry dough into a sheet approximately twice as long as it is wide, having dimensions approximately 36 inches long, 18 inches wide, and ½ inch thick. The fatty material, such as pastry margarine or shortening, packaged in the standard five-pound block or loaf or in large bulk containers, is then spotted over approximately two-thirds of the surface of the rolled dough by placing small portions of the fat on the surface of the dough to form a continuous sheet over the left two-thirds, for example, of the sheet of dough. The one-third of the sheet of dough which has not been spotted with the pastry margarine, for example, is then folded over half of the margarine-spotted dough, and the remaining third of the margarine-spotted dough is folded over the previously folded section of the dough. This forms three layers of dough separated by layers of margarine. The folded dough and margarine is then rolled out to approximately its original size so that the layers of dough are separated by thin, continuous layers of margarine, and the folding and rolling processes repeated without adding additional fatty material. The foregoing rolling and folding procedure is normally repeated many times in order to obtain several hundred layers of dough separated by layers of fatty material so that the desired flaky texture in the final product is obtained.

As an alternate procedure for making roll-in pastry dough which is particularly applicable for making puff pastry doughs, the same amount of dough used in the preceding method is rolled out into a sheet having approximately the same dimensions as that used in the preceding method. The fatty material packaged in the standard five-pound block of pastry margarine or shortening is then divided into two equal portions and rolled out in the form of a sheet having a length equal to slightly less than the width of the dough and a width equal to about one-third of the length of the dough. This is generally accomplished most conveniently by rolling the fatty material between two sheets of oiled paper. One of the sheets of fatty material is then placed crosswise in the center of the rolled dough and one end of the dough folded onto the sheet of fatty material to completely cover the layer of fatty material. The second layer of rolled fatty material is placed on top of the folded section of the dough and the other edge of the rolled dough is folded over the second layer of the fatty material. In this manner there are formed three layers of dough separated by layers of fatty material. The folded dough and margarine is then rolled to form a sheet approximately the size of the original rolled dough and again folded in the foregoing manner without adding additional fatty material. After folding in the described manner, the dough is again rolled and the process repeated many times. It is evident from the foregoing that the process of incorporating the fatty material when making roll-in pastry dough is extremely time-consuming and presently involves extensive manual labor.

It is an object of the present invention to provide fatty material in a form suitable for immediate use in the preparation of roll-in pastry dough products.

It is a further object of the present invention to provide a more uniform sheet of fatty material for use in the manufacture of roll-in pastry dough products to obtain greater uniformity throughout the dough.

It is another object of the present invention to provide a fatty material used in the manufacture of a roll-in pastry dough product in a form which greatly decreases the amount of manual labor required in making roll-in pastry dough products.

It is also an object of the present invention to provide an improved package of fatty material used in the manufacture of roll-in pastry dough products.

It is a still further object of the invention to provide improved means of forming sheets of fatty material for use in the manufacture of roll-in pastry dough products.

Other objects of the present invention will be apparent from the detailed description, the accompanying drawings, and the claims to follow.

Figure 1:
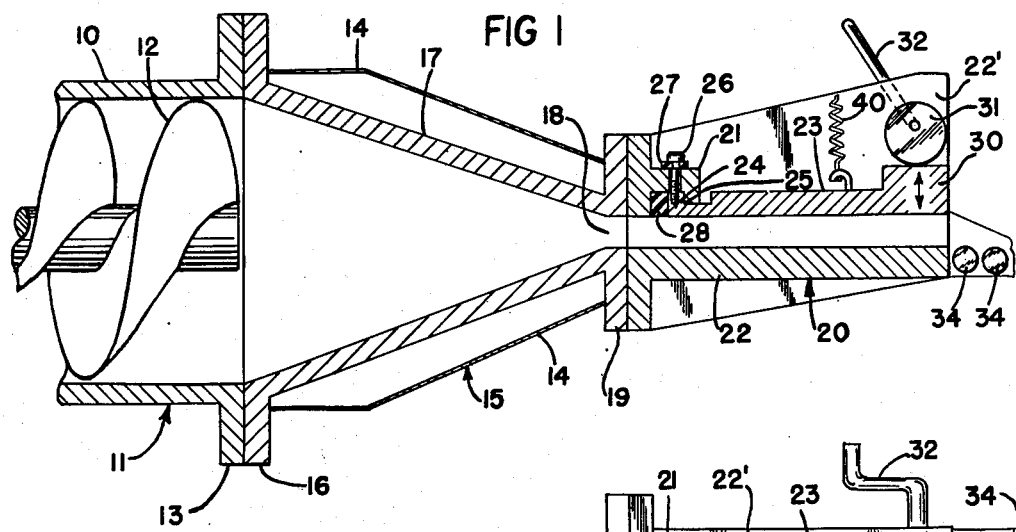
Fig. 1 represents a diagrammatic vertical sectional view of the preferred apparatus for extruding fatty material and means for conveying said extruded fatty material.
Figure 2:
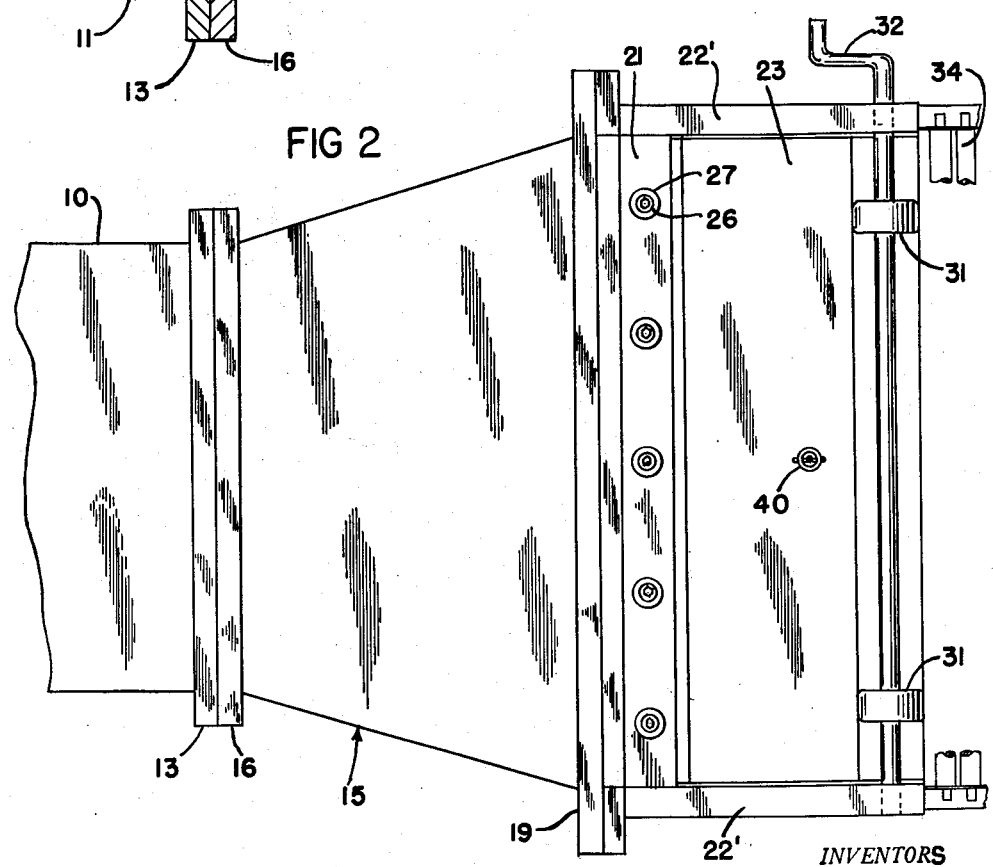
Fig. 2 is a plan view of the apparatus shown in Fig. 1.
Figure 3:
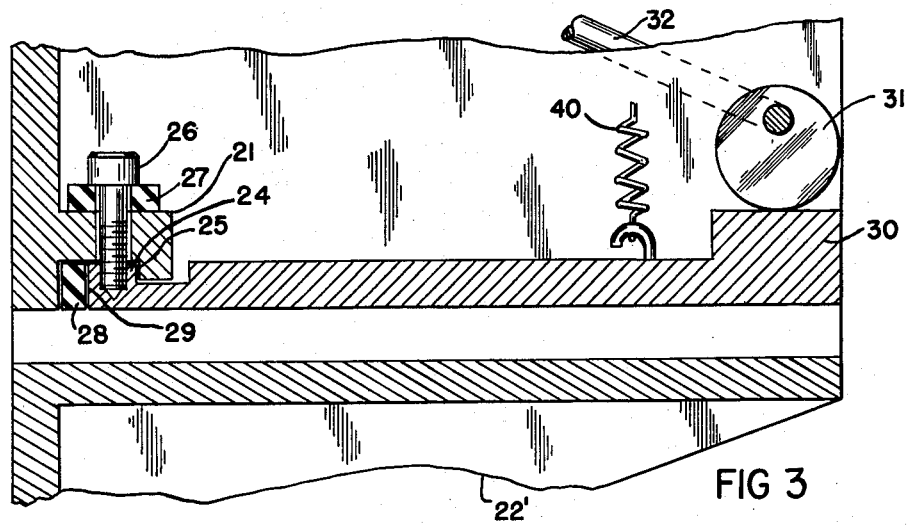
Fig. 3 is a detailed sectional view of the adjustable extruding nozzle shown in Fig. 1.
Figure 4:
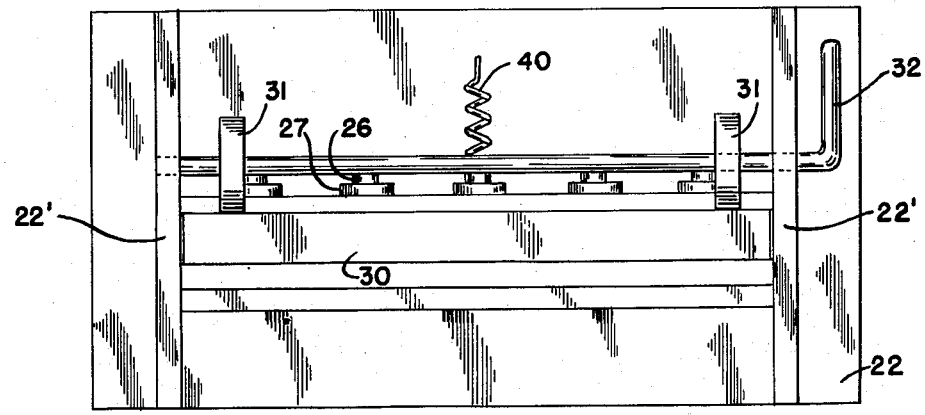
Fig. 4 is an end view of the adjustable extruding nozzle shown in Fig. 3.
Figure 5:
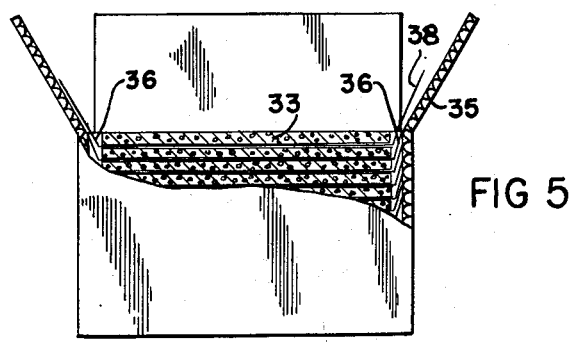
Fig. 5 is a vertical sectional view of the composite package of sheeted fatty material arranged within a container.

Referring more particularly to the details of the structure shown in the accompanying drawings, the housing 10 of a margarine extruding device 11 having conventional feed screws 12 disposed therein is provided with a rectangular flange 13 at the outlet thereof. A spreader means 15 having a flange 16 on the inlet end thereof is secured to the rectangular flange 13 of the margarine extruding device 11.

The spreader means 15 is comprised of a body portion 17 which tapers gradually in vertical elevation toward the discharge end 18 and also gradually flares outwardly in horizontal elevation toward the discharge end 18. The discharge end 18 of the said spreader means has substantially the same width as that of the desired sheet of fatty material. The tapered body portion 17 is provided with a water jacket 14 through which warm water is passed.

Since the specific gravity of the fatty material may at times vary appreciably from one batch of fatty material to another, it is essential to include means for adjusting the thickness of the sheet of fatty material so that each section of the fatty material of a given length will contain a given weight of material. To accomplish the foregoing, an adjustable extruding nozzle designated generally as 20 is connected to the flange 19 at the discharge end of the spreader means 15. This discharge nozzle 20 is comprised of a heavy body portion 21 with a lower plate 22 integral therewith and an upper adjustable plate 23 which cooperates with said lower plate 22. The lower plate 22 is secured directly to the flange 19 of the spreader means and has vertically upturned side portions 22' which are accurately machined to the proper dimensions to receive the adjustable upper plate 23. The inner end of the said upper plate 23 has a rectangular lip or flange 24 thereon which fits within a rectangular slot 25 in the body portion 21 of the discharge nozzle. The rectangular flange 24 fits loosely within slot 25 in order to permit the necessary slight vertical adjustment of the outer end of the upper plate 23. Sufficient clearance within the rectangular slot 25 is required to permit the outer end of the upper plate 23 being lowered and raised to vary the discharge opening of the nozzle from a minimum of about 0.375 inch to a maximum of about 0.50 inch, while the inner end of the discharge nozzle is maintained constantly at approximately 0.50 inch. The upper plate 23 is maintained within the rectangular slot 25 by means of a bolt 26 which passes through an opening in the flange 23 and is maintained in threaded engagement within the upturned rectangular flange 24 on the upper plate 23. The opening in the body portion 21 of the plate 22 is sufficiently large to allow the shank of the bolt 26 to fit loosely therein but still prevents the passage of the head of said bolt therethrough. The compressible washer 27 between the head of the bolt 26 and the upper surface of the body portion 21 of the plate 22 permits the upper end of the flange 24 of the plate 23 being drawn tightly against the inner surface of the rectangular slot 25 while still permitting the upper plate 23 to be moved readily. In this manner plate 23 is maintained within the rectangular slot 25 and may at the same time be pivoted therein to provide the necessary vertical adjustments of the discharge nozzle 20. A gasket 28 fits snugly within the rectangular slot 25 between the end wall 29 of the upper plate 23 and the oppositely disposed wall of the rectangular slot 25 and functions so as to take up the lost motion within the said slot 25 and to form a tight seal which prevents the loss of any fatty material.

The outer end of the adjustable upper plate 23 is provided with an enlarged section 30 which serves as a bearing surface for a cam member 31. The said cam member 31 is suitable for varying the opening of the discharge nozzle and is provided with an adjusting means, such as an operating lever 32. If desired, lever 32 may be manually controlled or preferably the lever 32 is operatively connected through suitable electric controls with an automatic weighing scale so that the opening of the discharge nozzle can be automatically adjusted to provide a section of margarine 33 of a given length having a constant weight. A tension spring 40 is secured to the upper plate 23 adjacent the outer end thereof to facilitate accurately controlling the discharge opening of the nozzle 20. In general, the opening of the extrusion nozzle 20 has dimensions approximately $\frac{7}{16}$ inches thick by 11 inches wide, and the extruded sheet of fatty material is cut with a wire frame or the like to form sections about 14 inches long. Sheets of pastry margarine having the foregoing dimensions weigh 2.5 pounds.

To facilitate the handling of the sheet of extruded fatty material and the sections cut therefrom, a series of conveying rolls 34 are disposed immediately adjacent to the discharge nozzle and extended horizontally several feet away from the said discharge nozzle so as to provide suitable working space for the handling of the sections of the margarine 33 which are cut from the continuously discharged sheet of margarine.

In operating the foregoing apparatus to provide the desired sheet of fatty material such as pastry margarine or shortening, the fatty material, such as pastry margarine having the conventional formulation, is introduced into the extruding apparatus 11 and is forced into the spreader means 15 by the feed screw 12 so that the cross section of the margarine is transformed from a thick, semi-rectangular mass to a relatively thin, wide rectangular ribbon having a cross section slightly larger than the desired cross section of the final section of margarine. After the margarine leaves the spreader means and enters the adjustable extruding nozzle 20, the final molding of the sheet to the precise dimensions required takes place. When the adjusting means is manually controlled, the operator takes individual sections of the margarine 33 cut to the dimensions required by the packaging means and test weighs the sections of margarine to determine whether it is within the specified weight limits. If the weight requirement is not met, the operator adjusts the cam lever 32 in order to either increase or decrease the discharge opening so that the proper weight is obtained. In this manner the weight of the individual sections of margarine is maintained within the required limits.

After the sections of pastry margarine 33 are cut to the proper length for accommodation by the container 35, a sheet of parchment paper 36 having substantially the same width as the section of margarine and a length several inches longer than the said section is placed on the top surface of the margarine in closely adhering contact with the surface of said margarine so that it extends several inches beyond each end of the section of margarine. The section of margarine 33 with the parchment paper 36 adhering thereto is then inverted so that the paper is on the underside of the section of margarine and thereby acts as a support for the section of margarine when handling as well as acting as a separator between a subsequently superimposed section of margarine. Because of the tacky consistency of pastry margarine and pastry shortening, the parchment paper forms a firm bond with the fatty material and permits the margarine to be manipulated and inverted without becoming separated from the paper backing. The section of margarine supported by the parchment paper is then placed within a suitable rigid container 35, such as cardboard box which is preferably lined with grease-proof paper. The internal length and width of the container or box are only slightly larger than those of the section of margarine so that the margarine fits snugly within the container and yet may be readily removed therefrom. When the section of sheeted margarine is placed within the container, the paper backing extending beyond the ends of the section of margarine is bent upwardly and forms lifting tabs 38 for both inserting and removing the margarine from the container. Additional sections of sheeted margarine 33 having an adhering parchment paper backing are then successively placed one on top of the other within the container 35 so as to form a composite package of a plurality of sections of sheeted margarine each of which is suitable for immediate use in the preparation of puff pastry without requiring preliminary rolling out or spotting. Preferably, twelve sections of sheeted margarine, each weighing 2.5 pounds and separated by a backing sheet of parchment paper, are placed in a container to form a composite package containing 30 pounds of margarine.

The sheet of fatty material of our invention is in a form suitable for immediately combining with rolled pastry dough and comprises a relatively thin rectangular section of an edible pastry shortening material having a first dimension slightly smaller than the width of the conventional sheet of rolled pastry dough and a second dimension about one-third the length of this conventional sheet. A flexible sheet detachably adheres to one side of this sheet of shortening material to act as a support and backing member to facilitate the manipulation and handling of the shortening section.

In preparing a roll-in pastry dough product, such as puff pastry, using pastry margarine or the like, sheeted and packaged in the foregoing manner, 10–12 pounds of pastry dough is rolled out in the conventional manner into a sheet approximately twice as long as it is wide and generally having the dimensions 36 inches by 18 inches by ½ inch. One section of the sheeted margarine 33 is then removed from the composite package by lifting the end tabs 38 provided by the parchment paper 36, and the section of margarine 33 is placed with the upper surface downwardly over the center of the said sheet of puff pastry. The parchment paper 36 is removed from the margarine by turning the paper upon itself and pulling until the paper is removed. As the section of margarine covers approximately the center third of the sheet of pastry dough, there is on each side of the center section an area about one-third of the sheet of pastry dough left uncovered by the margarine. One of the end sections of the pastry dough is then folded over the top of the section covered by the margarine and a second section of sheeted margarine is removed from the composite package and placed with its upper surface downwardly on top of the section of pastry dough which was folded over the first section of sheeted margarine. After removing the backing sheet of paper, the end of the sheet of pastry dough which was not covered with margarine is folded on top of the second section of sheeted margarine. The pastry dough and margarine folded in the foregoing manner is then rolled out to approximately the original size of the rolled pastry dough and the folding process is repeated, without, however, adding additional margarine. The folding and rolling process is generally repeated many times so as to obtain several hundred layers of pastry dough separated by thin layers of fatty material. In this manner a pastry having a uniformly light, flaky texture is obtained with a minimum amount of manual handling of the fatty material.

While the present discussion has referred primarily to the procedure for preparing puff pastry with sheeted pastry margarine, it should be understood that the invention is equally well adapted for shaping and packaging other pastry shortening products having preferably a smooth, plastic, relatively waxy consistency making it substantially form retaining which may be used in the preparation of other roll-in pastry dough products, such as Danish pastry, wherein substantially the same extruding, assembly, and rolling procedure is following as was described in connection with the preparation of puff pastry.

It should also be understood that the section of margarine and the backing member for the section of margarine, for example, may be of any desired size, provided the backing member is sufficiently large to extend beyond at least two of the opposite sides of the section. In some instances it may be desirable to have the backing member extend beyond all four sides of the section of shortening material so that at least two opposite ends may be folded over the upper surface of the section of margarine. The backing member may be any flexible sheet which does not impart disagreeable odors and properties to the edible product in contact therewith. Flexible sheet material including cellophane, Pliofilm, and other plastic film materials may be used in addition to the parchment paper specifically mentioned.

Obviously, many modifications and variations of the invention as hereinbefore set forth may be made without departing from the spirit and scope thereof, and therefore only such limitations should be imposed as are indicated in the appended claims.

We claim:

1. A package of sheeted pastry shortening suitable for immediate use in preparing roll-in dough pastry products, comprising a plurality of relatively thin rectangular sections of roll-in dough pastry shortening material in superimposed relationship within a rigid rectangular container, each of said sections having detachably adhering to the lower side thereof a flexible sheet serving as a backing member and separator between adjacent sections of shortening, and each of said flexible sheets extending beyond at least two of the opposite sides of the said sections of shortening and being bent upwardly along the immediately adjacent wall of the said container.

2. A package of sheeted pastry margarine suitable for immediate use in preparing puff pastry without initial preparation, comprising a plurality of relatively thin rectangular sections of pastry margarine in superimposed relationship within a rigid rectangular container, each of said sections having detachably adhering to the lower side thereof a sheet of parchment paper serving as a backing member and separator between adjacent sections of margarine, and each of said sheets of parchment paper extending beyond at least two of the opposite sides of the said section of margarine and being bent upwardly along the immediately adjacent wall of the said container.

3. As an article of manufacture, pastry margarine in a form suitable for immediately combining with rolled pastry dough for preparing puff pastry without initial preparation, which comprises a relatively thin rectangular section of pastry margarine having a first dimension slightly smaller than the width of the conventional sheet of rolled puff pastry dough and a second dimension approximately one-third the length of the said sheet of rolled puff pastry dough, said section of pastry margarine having detachably adhering to the lower side thereof a thin flexible sheet acting as a backing member to facilitate the manipulation and handling thereof.

4. As an article of manufacture, edible pastry shortening material in a form suitable for immediately combining with a sheet of rolled pastry dough without initial preparation, which comprises a relatively thin rectangular section of an edible pastry shortening material which has a relatively thick waxy consistency, said rectangular section having a first dimension slightly smaller than the width of the conventional sheet of rolled pastry dough and a second dimension about one-third the length of the said sheet of rolled pastry dough, and a flexible sheet detachably adhering to one side of the said section of shortening material acting as a support and backing member therefor to facilitate the manipulation and handling of the said section of shortening material.

References Cited in the file of this patent

UNITED STATES PATENTS

| Number | Name | Date |
|--------|------|------|
| Re. 18,426 | Willoughby | Apr. 19, 1932 |
| 1,904,741 | Lorber | Apr. 18, 1933 |
| 1,988,058 | Traller | Jan. 15, 1935 |
| 2,395,051 | Horneman et al. | Feb. 19, 1946 |

OTHER REFERENCES

"Baker's Helper," June 24, 1950, part I, pages 1-3 and 5-8; article entitled "Margarine for Baking," by W. E. Broeg.